Feb. 13, 1934.  B. A. WADERLOW  1,946,994
CAR COOLER
Filed Sept. 21, 1932

Inventor
Benjamin A. Waderlow

By Blackmore, Spencer & Fluck
Attorneys

Patented Feb. 13, 1934

1,946,994

UNITED STATES PATENT OFFICE

1,946,994

CAR COOLER

Benjamin A. Waderlow, Flint, Mich., assignor to General Motors Corporation, Detroit, Mich., a corporation of Delaware Application September 21, 1932
Serial No. 634,109

3 Claims. (Cl. 257—7)

My invention relates to motor vehicles, and its primary object is to promote the comfort of vehicle occupants and make travel more pleasant.

More specifically, my invention has to do with temperature conditions, and I propose to incorporate in a vehicle body an air conditioning device for producing an agreeable and comfortable inside temperature, regardless of the weather. A decrease or an increase in inside temperature may be had as desired, dependent upon whether the day is hot or cold. The invention, however, is not limited to use on passenger vehicles and may be applied to carriers of livestock or perishable merchandise and to any space where temperature modification is desired.

Figure 1:
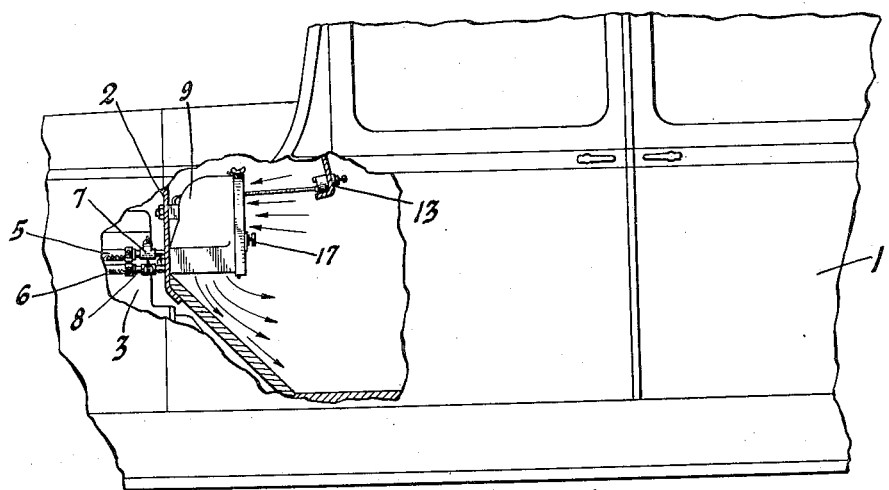
Figures 2, 3:
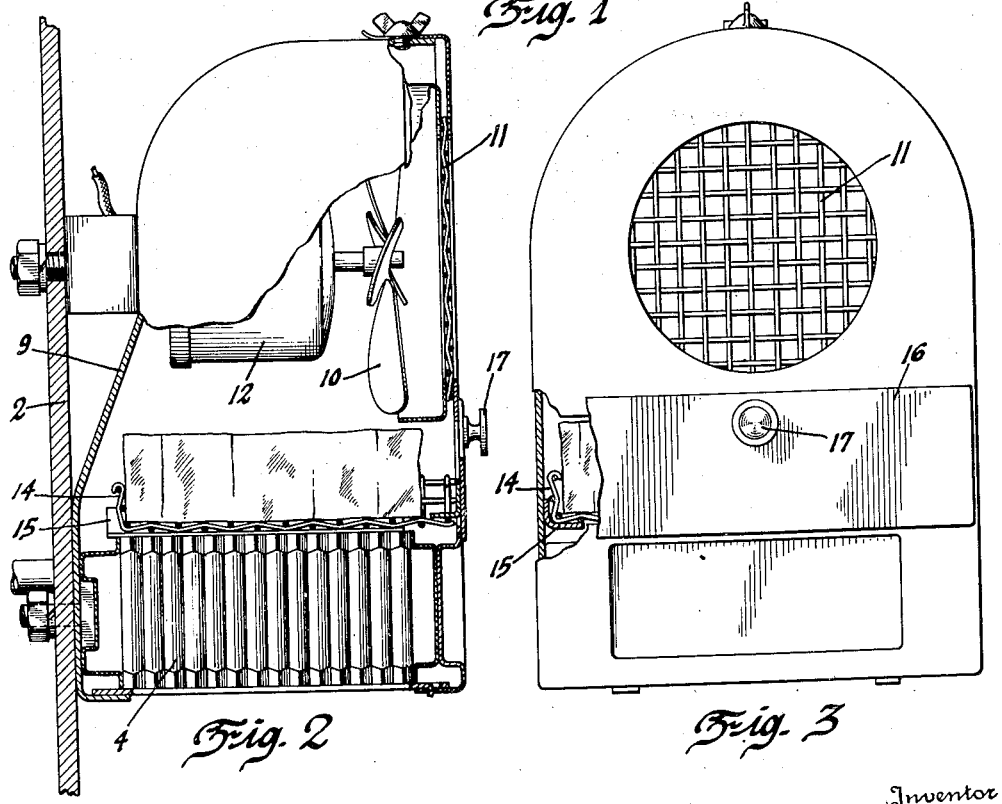

A preferred, but not necessarily the only embodiment of the invention, is illustrated in the accompanying drawing, wherein Figure 1 is a side elevation of a fragment of a motor vehicle with parts broken away to illustrate a satisfactory installation, and Figures 2 and 3 are, respectively, a sectional view and a front elevation with parts in section of the air conditioning unit.

Referring to the drawing, the numeral 1 indicates a closed automobile body having at its forward end a dash 2, which separates the passenger compartment from the space which encloses the engine 3. The usual engine employed for driving a motor vehicle is of the internal combustion type and is provided with a water cooling system which includes an air cooled radiator and a jacket or water space in the cylinder block, and the circulating water or other cooling liquid takes up the heat of combustion in the engine and transfers it to the air stream flowing through the radiator. It is here proposed to utilize a portion of such heat for warming up the inside of the body, and accordingly I have provided a heat radiating unit to be tapped into the engine cooling system. This unit may include the core 4 of the usual cellular type which comprises an assembly of tubes between which the heating medium is adapted to flow, and through which air may be passed to effect a transfer of heat. The inlet and outlet headers of the heat radiating unit are arranged for connection through a hot water supply line 5 and a return conduit 6, respectively, with the engine cooling system. Valves 7 and 8 may be provided to control the flow of liquid through the conduits 5 and 6.

As shown in the drawing, the heat radiating unit 4 is mounted in one end of a housing or casing 9, which for convenience is secured to the dash board 2. This casing provides a passageway for the flow of air contained within the enclosed space of the body and the flow of air may be set up by the use of a suitable circulating device, such as a fan 10, located in back of the screened opening 11 in the front wall of the casing 9. The fan 10 can be driven in any suitable fashion as, for example, by an electric motor 12 operated by current from the usual vehicle storage battery and controlled by a conveniently located switch 13. The rate of heat exchange can be controlled by varying the air flow with the use of either an air throttle or some means to change the speed of fan rotation. Air travel may be in either direction through the casing, but it is preferred to draw the air through the screened opening 11 and direct it downwardly through the radiator core 4 and toward the floor boards of the vehicle.

Mounted just above the core there is shown in the drawing, a screen or perforated tray 14 in the form of a drawer that is slidable on guides or ways 15 through an opening in the front wall of the casing, which opening normally is closed by a plate 16, forming a part of the drawer and carrying a hand button or knob 17. This tray is intended for the support, in the path of air flow, of a refrigerating medium, preferably of solid form. Solid carbon-dioxide commonly known by the more familiar descriptive term, dry ice, has been found to be an ideal refrigerant for the purpose. It is favored principally because of its extremely low temperature and because it passes into a dry gaseous state as it melts or absorbs heat. No provision is necessary for carrying away drip. Dry ice is economical to use and may be readily obtained.

With the device described, it will be apparent that the air within the closed body will be circulated by the fan through the casing and over the refrigerating or heating medium, depending upon whether it is desired to heat or cool the passenger compartment. In this way the inside temperature can be maintained at the right degree for utmost bodily comfort.

I claim:

1. In a motor vehicle, the combination with an engine having a liquid cooling system and an enclosed body, of a casing located within the body and provided with air entrance and discharge openings communicating with the interior of the body, a fan at the air entrance opening for recirculating air from within the body through said casing, a heat exchanger between the fan and said discharge opening, inlet and outlet connections between said heat exchanger and the engine cooling system, and a tray adapted to receive a supply of dry ice and position the same within the casing and in the path of the air current produced by the fan.

2. In a motor vehicle, the combination with a water cooled engine and an enclosed body, of a casing having air inlet and outlet openings communicating with the interior of the body, a fan for blowing air through the casing, a heat exchanger mounted in the casing and connected for the flow of engine cooling water, a perforate tray slidable through an opening in the wall of the casing to support dry ice in the path of air blown by the fan, and a closure plate for said wall opening mounted on and forming a part of said tray.

3. In a motor vehicle, the combination with a water cooled engine and an enclosed body, of a heat exchanger connected for the flow of engine cooling water therethrough, a casing therefor communicating with the interior of the body, means to force air through said casing, a pair of spaced slide rails, a removable refrigerant tray slidably supported on said rails for movement through an opening in the wall of the casing, and a closure for said opening mounted on the tray.

BENJAMIN A. WADERLOW.